March 21, 1961     W. H. EDMUNDS     2,976,385
CIRCUIT BREAKER FOR BOLTED AND PLUG-IN CONSTRUCTIONS
Filed April 3, 1959     3 Sheets-Sheet 1
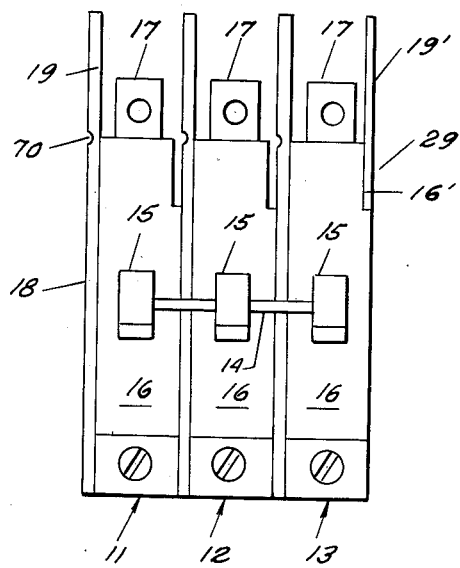
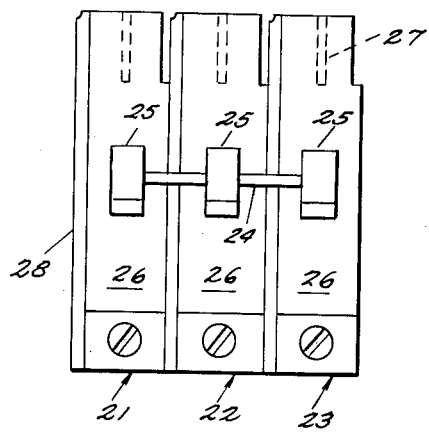
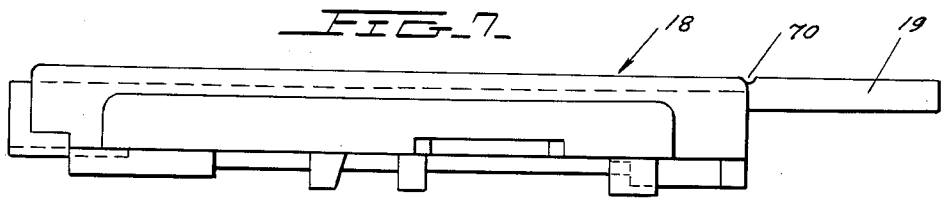
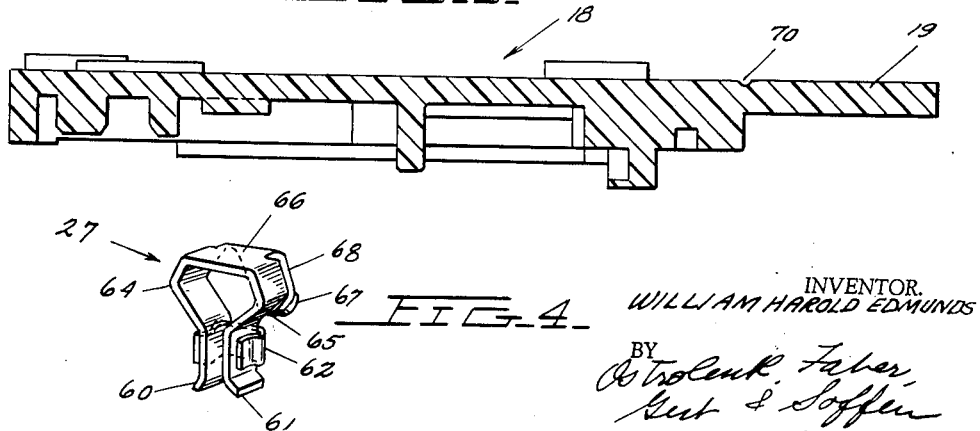
INVENTOR.
WILLIAM HAROLD EDMUNDS
BY
ATTORNEYS

INVENTOR.
WILLIAM HAROLD EDMUNDS

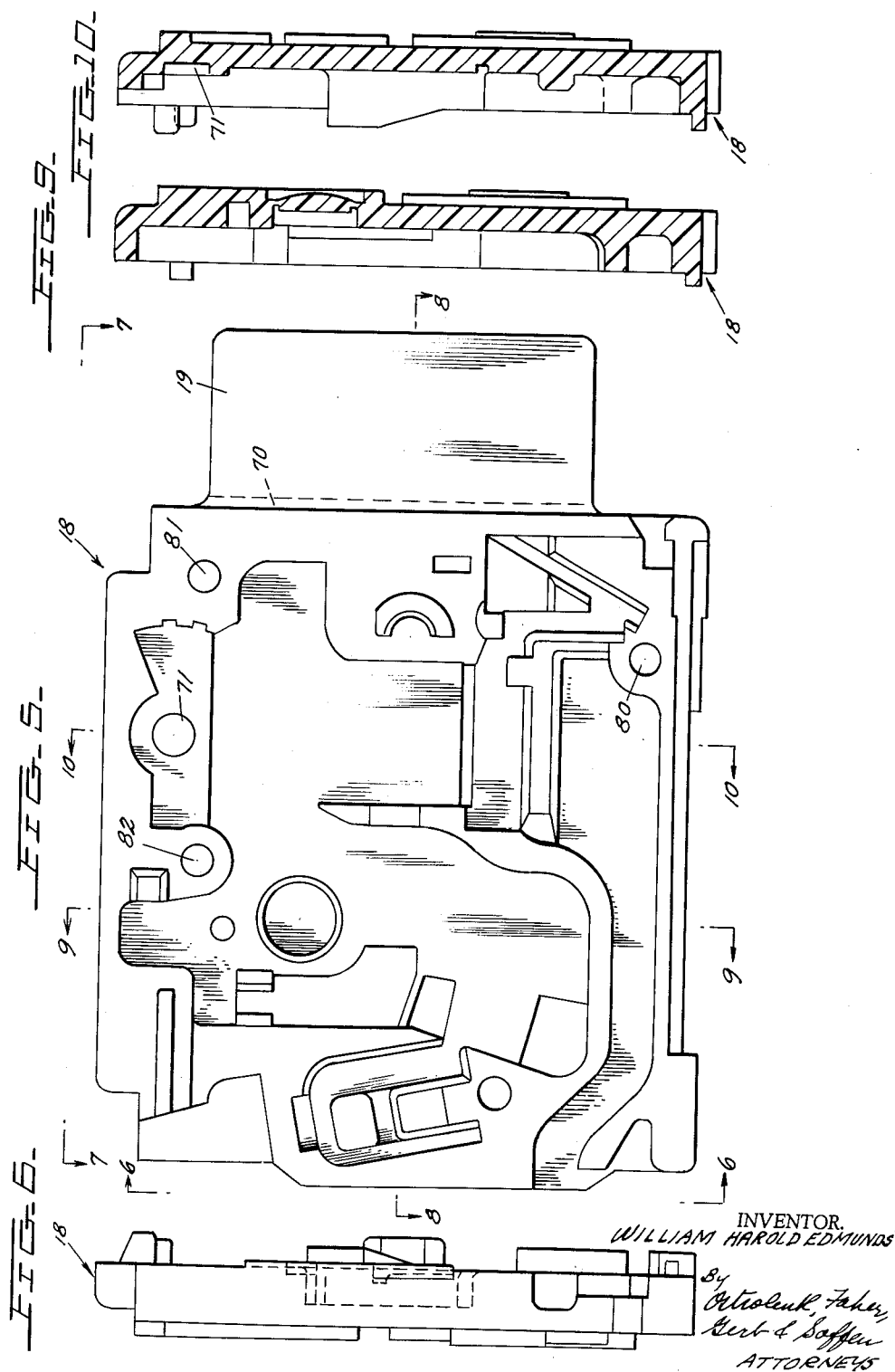

United States Patent Office 2,976,385
Patented Mar. 21, 1961

2,976,385

CIRCUIT BREAKER FOR BOLTED AND PLUG-IN CONSTRUCTIONS

William Harold Edmunds, Havertown, Pa., assignor to I-T-E Circuit Breaker Company, Philadelphia, Pa., a corporation of Pennsylvania Filed Apr. 3, 1959, Ser. No. 803,909

2 Claims. (Cl. 200—168)

The instant invention generally relates to circuit breakers and more particularly to construction for plug-in and bolted type circuit breakers wherein the two types of breakers are constructed of many common parts.

Presently, small circuit breakers generally in the 15–50 ampere range, utilized to protect branch circuits in the home are constructed with a line terminal of either the bolted or plug-in type. Hereinafter a circuit breaker having a line terminal which requires a bolted connection to the panelboard bus bars shall be designated a bolted breaker and a circuit breaker having a line terminal which engages the bus bars by merely being forced into contact therewith shall be designated as a plug-in breaker.

According to the instant invention all of the electrical and operating parts of the plug-in breaker with the exception of the line terminal are identical with those parts of the bolted breaker. Further, the molded open side casings for both types of breakers are the same, however, the molded covers are different. That is, it is necessary to barrier the bolted type line terminals for electrical clearance purposes so that for the bolted breaker the cover extends beyond the end of the casing to provide the insulating barrier. In the plug-in breaker the line terminal is recessed so that barriers are not required and the cover does not extend beyond the end of the casing.

In order to further reduce the number of different parts required for the two different types of breakers, a common cover is molded for both breakers. The common cover is provided with an indent which defines a break-off portion which in the case of the bolted breaker provides the insulating barrier extending beyond the casing. The remaining portion of the common cover provides the closure for the casing and includes appropriate formations, molded integrally therewith, for positioning the electrical and operating parts of the circuit breaker.

When a plug-in breaker is being assembled the common cover is split along the indent and the break-off portion discarded. The remaining cover portion is of a size which enables it to serve as the casing closure.

The constructions hereinbefore described permits the manufacture of single pole breakers and multipole breakers, of stacked construction, of both the plug-in and bolted type with a minimum number of parts that are not common to both types of breakers.

Accordingly, a primary object of the instant invention is to provide a novel construction for a plug-in and bolted circuit breakers which minimizes the number of parts which are not common to both types of breakers.

Another object is to provide a molded cover, for a circuit breaker casing, having an indent defining a break-off portion whereby the cover for a bolted circuit breaker may be utilized for a plug-in circuit breaker by merely removing the break-off portion.

These as well as other objects of the instant invention shall become readily apparent after reading the following description of the accompanying drawings in which:

Figure 1 is a plan view of a stack of three bolted circuit breakers constructed in accordance with the teachings of the instant invention.

Figure 2 is a plan view of a stack of three plug-in breakers constructed so as to minimize the number of parts not common to the bolted circuit breakers of Figure 1.

Figure 4 is a perspective of a plug-in line terminal.

Figure 5 is a side elevation of the cover of the circuit breaker of Figure 1 looking at the surface having the formations for positioning the electrical and operating parts of the circuit breaker.

Figure 6 is an end view of the common cover looking in the direction of arrows 6—6 of Figure 5.

Figure 7 is a top view of the common cover looking in the direction of arrows 7—7 of Figure 5.

Figures 8–10 are cross-sections of the common cover taken through lines 8—8, 9—9, and 10—10, respectively, of Figure 5 looking in the directions of the respective arrows.

Figure 3:
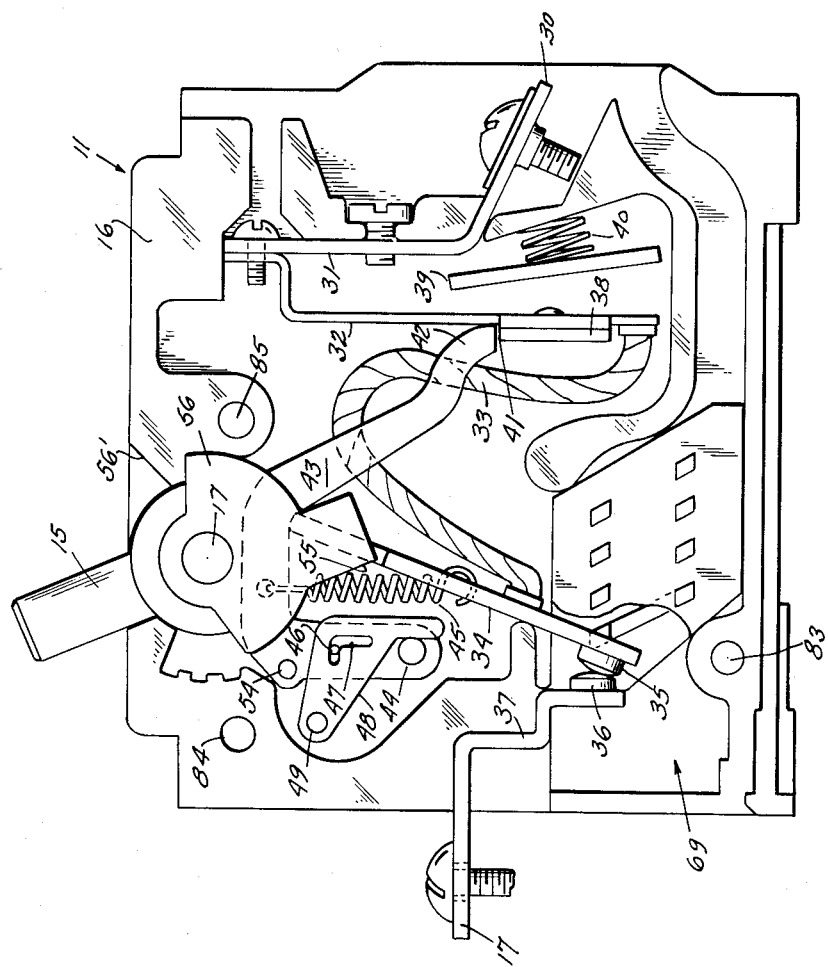
Figure 3 is a side elevation with the cover removed of one of the plug-in breakers of Figure 1 showing the electrical and operating parts.

Now referring to the figures, Figure 1 illustrates three bolted type circuit breakers 11—13 stacked side by side. Each of the bolted circuit breakers 11—13 are of identical construction. A tie bar 14 interconnects the operating handles 15 of all three bolted circuit breakers 11—13 for simultaneous manual operation thereof.

Figure 2 illustrates three plug-in type circuit breakers 21—23 stacked side by side. Each of the plug-in circuit breakers 21—23 are of identical construction. A tie bar 24 interconnects the operating handles 25 of each of the plug-in circuit breakers 21—23 for simultaneous manual operation thereof.

The casing 16 of bolted circuit breaker 11 is identical in construction to the casing 26 of plug-in circuit breaker 21 and, as will be hereinafter explained, all of the electrical and operating parts of circuit breakers 11 and 21 are identical except for the difference in construction of the bolted line terminal 17 and the plug-in line terminal 27.

In the case of the bolted circuit breaker 11 the cover 18 therefor extends beyond the line end of casing 16 to form an insulating barrier 19 between adjacent line terminals 17. It is to be noted that the cover 18 merely forms a barrier extending beyond the left side (with respect to Figure 1) of casing 16 so that the right hand circuit breaker 13 must be provided with a shield 19' which is partially disposed within a casing recess 16' and is secured to casing 16 by means of a drive screw (not shown). The cover 28 for the plug-in circuit breaker 21 is only as long as casing 26 since plug-in line terminal 27 does not extend beyond the line end of casing 26.

Now referring more particularly to Figure 3, bolted circuit breaker 11 is of a type illustrated in U.S. Patent 2,769,049 issued October 30, 1956 to W. H. Edmunds, entitled "Quick Break Circuit Breaker," and assigned to the assignee of the instant invention. Briefly, circuit breaker 11 comprises a molded insulating casing 16 having manual operating handle 15 pivotally mounted thereto at 17 and extending through an opening in the top surface of casing 16. The current path through circuit breaker 11 comprises load terminal 30; conducting member 31 to the fixed end of bimetal 32, braided conducting member 33; which is secured to the free end of bimetal 32 and to contact arm 34; movable contact 35; stationary contact 36; and stepped conducting member 37, whose free end forms bolted line terminal 17.

Magnet 38 is secured to bimetal 32 near the free end thereof and, when sufficiently energized, is attracted toward armature 39 which is mounted to cushioning spring 40. The top edge 41 of magnet 38 provides a latch surface which engages the latch tip 42 of cradle 43 pivotally mounted to casing 16 at 44. Operating spring 45, which provides snap action for both opening and closing of circuit breaker 11, is connected between contact arm 34 and cradle 43. Resetting member 56 is integrally molded with manual operating handle 15 and provides a pivot for contact member 34. Common cover 18 is provided with apertures 80—82 which are aligned opposite apertures 83—85 respectively of casing 16 to accommodate suitable means for fastening cover 18 to casing 16.

In the position of Figure 3 circuit breaker 11 is illustrated in its closed position. Circuit breaker 11 is operated to the open position when manual operating handle 15 is rotated clockwise about its pivot 17. As this is done contact arm 34 is slowly pivoted counterclockwise about stationary contact 36 with contacts 35, 36 remaining in engagement until such time as the pivot point for the upper end of contact arm 34 passes to the left of operating spring 45 at which time spring 45 takes over to cause a snap action opening of circuit breaker 11.

Automatic tripping of circuit breaker 11 takes place when the free end of bimetal 32 is either deflected to the right because of overheating of the bimetal or because of the attraction between magnet 38 and armature 39. This frees latch tip 42 from latch surface 41 and permits cradle 43 to rotate clockwise about its pivot 44 under the influence of operating spring 45. At the point where the upper end of spring 45 passes to the right of contact arm 34 the operating spring 45 will take over to cause a snap opening of circuit breaker 11.

As cradle 43 moves clockwise about pivot 44 to its unlatched position, the pin 46 projecting therefrom moves to the bottom of inverted L-shaped slot 47 of guide member 48 which is pivotally mounted at 49. This maintains operating handle 15 in a mid-position between the On position of Figure 3 and the Off position to the right thereof (not illustrated). Relatching of cradle 43 is accomplished by moving operating handle 15 to the manual Off position where handle 15 abuts case surface 56. During this movement surface 55 of resetting member 56 engages pin 54, projecting from cradle 43, thereby rotating cradle 43 counterclockwise about its pivot 44 until handle tip 42 is in engagement with latch surface 41.

As previously noted, the casings 16 and 26 of bolted and plug-in circuit breaker 11, 21, respectively, are identical in construction as are the elements mounted thereto with the exception of line terminals 17 and 27. Plug-in line terminals 27 (Figure 4) comprises two spaced generally parallel clip arms 60, 61. A generally U-shaped spring 62 straddles arms 60, 61 and biases these arms 60, 61 to the position illustrated in Figure 4 whenever they are spread apart.

Arms 60, 61 are provided with outwardly bowed extensions 64, 65, respectively, which are joined by web 66. Stationary circuit breaker terminal 67 is mounted to the free end of conducting extension 68 projecting rearwardly of web 66. Conducting member 37 may readily be replaced by line terminal 27 which will then be disposed in the case recess generally illustrated as 69. When cover 28 is mated to casing 26 a suitably shaped slot (not shown) is formed to permit arms 60, 61 to engage a panelboard stab. This slot extends from the bottom of circuit breaker 21 to the line end thereof.

Cover 28 of plug-in breaker 21 is formed by breaking away barrier portion 19 of common cover 18. For this purpose, common cover 18 is provided with an appropriately positioned notch 70. Common cover 18 is also provided with suitable formations, such as circular recess 71 which receives pivot 17 for defining the path of movement of manual operating handle 15, to position the electrical and operating elements of the circuit breaker. Since it would serve no useful purpose to describe in detail each of the integrally molded formations of common cover 18, this has been dispensed with. Instead, cross-sections 8—8, 9—9 and 10—10 as well as top and end views of common cover 18 have been provided. It is believed that these illustrations are self-explanatory and adequately define the shape of common cover 18.

Thus, the instant invention provides constructions for bolted and plug-in type circuit breakers utilizing only one component, the line terminal, which is not common to both types of circuit breakers. An outstanding feature of these constructions is the utilization of a common cover having a break-off portion which is selectively removable. That is, the break-off portion is not removed when the common cover is used for a bolted type circuit breaker and forms a barrier between line terminals of adjacent breakers. However, the break-off portion is removed when the common cover is utilized for a plug-in type circuit breaker.

Although I have here described preferred embodiment of my novel invention, many variations and modifications will now be apparent to those skilled in the art, and I therefore prefer to be limited, not by the specific disclosure herein, but only by the appending claims.

I claim:

1. A circuit breaker including a hollow molded casing having an open side, a molded cover forming a closure for said open side, and a bolted type line terminal positioned externally of a first end of said casing; said cover including a first portion extending beyond said casing first end to form an insulating barrier between said line terminal and a line terminal of a similar circuit breaker positioned adjacent to said cover; said cover including formations whereby said first portion may conveniently be broken away and the remaining portion of said cover utilized as a cover for a circuit breaker having a plug-in line terminal.

2. A circuit breaker including a hollow molded casing having an open side, a molded cover forming a closure for said open side, and a bolted type line terminal positioned externally of a first end of said casing; said cover including a first portion extending beyond said casing first end to form an insulating barrier between said line terminal and a line terminal of a similar circuit breaker positioned adjacent to said cover; said cover including formations whereby said first portion may conveniently be broken away and the remaining portion of said cover utilized as a cover for a circuit breaker having a plug-in line terminal; said first recited circuit breaker also including electrical parts and operating parts operatively connected to said electrical parts whereby said circuit breaker may be opened and closed; said remaining portion including formations integrally molded therewith constructed to operatively position and maintain said electrical and operating parts in working relationship.

References Cited in the file of this patent
UNITED STATES PATENTS
2,767,354  Jackson et al. _____ Oct. 16, 1956